April 8, 1941.    J. MARIQUE    2,237,604
INSTANTANEOUS DIRECT READING RADIOGONIOMETER
Filed Dec. 7, 1937    3 Sheets-Sheet 1

INVENTOR
JEAN MARIQUE
By Young, Emery & Thompson ATTYS.

April 8, 1941.   J. MARIQUE   2,237,604
INSTANTANEOUS DIRECT READING RADIOGONIOMETER
Filed Dec. 7, 1937   3 Sheets-Sheet 3

INVENTOR
JEAN MARIQUE
BY Young, Emery & Thompson
ATTYS.

Patented Apr. 8, 1941

2,237,604

UNITED STATES PATENT OFFICE 2,237,604

INSTANTANEOUS DIRECT READING RADIOGONIOMETER

Jean Marique, Uccle-Brussels, Belgium

Application December 7, 1937, Serial No. 178,604
In Belgium January 15, 1937

11 Claims. (Cl. 250—11)

The present invention relates to an instantaneous direct reading radiogoniometer in which an explorer rotating at a speed of at least five revolutions per second is combined with a luminous indicator in such manner that the indications of the latter are at each instant a function of the electromotive force induced in the explorer by the electromagnetic field of the transmitter, the direction of which is sought.

Radiogoniometers of this nature are, for example, described in English Patents Nos. 380,385 and 447,238 and comprise either a mirror galvanometer or a neon lamp with luminous column of variable length rotating in synchronism with the explorer. These radiogoniometers present in particular the advantage of placing before the eyes of the observer a luminous image, the form of which depends upon the law of variation of the intensity of reception of the emissions by the explorer as a function of the orientation of the latter with respect to the transmitter.

But in the apparatus of this nature, the luminous indicator device placed in front of the observer always comprises a mechanical member rotating in synchronism with the explorer. This necessitates either that the observer be placed near the rotating explorer or that the rotating explorer and the luminous indicator be set in rotation by synchronous motors.

The present invention has for its object to remedy this drawback whilst at the same time placing before the observer's eyes a luminous image, the form of which represents the variation of intensity of reception as a function of the angle of rotation of the explorer.

To this end there is used as the luminous indicator a cathodic oscillograph, the movements of the electronic beam of which may be obtained, as is known, by purely electrical and/or magnetic means.

It is known to use (see, for example English Patents Nos. 247,344, 252,263 and 280,235) in order to determine the direction of a transmitter, a cathodic oscillograph provided with two pairs of electrodes deflecting the electronic beam, perpendicular one to the other. Each pair of electrodes is connected to an aerial fixed so that the electronic beam moves in a plane, the orientation of which with respect to a fixed mark determines the plane of the transmitter.

In English Patents Nos. 252,263 and 280,235, the plane in which the electronic beam moves is determined simply by the fact that the cathode ray beam traces a straight line on a screen. In English Patent No. 247,344 this plane is determined by the fact that the electronic beam strikes metallic electrodes which, when they are brought into the plane in question, actuate electric members, such as relays in consequence of the electric charge which they receive.

It is also known (see American Patent No. 1,471,406) to use in order to determine the direction of a transmitter, a cathodic oscillograph provided with a single pair of electrodes deflecting the electronic beam, this pair being connected electrically to an explorer adapted to be directed in position. In this case, the length of the fluorescent line on the screen of the oscillograph depends upon the intensity of reception; as this varies with the orientation of the explorer, the observer can direct the latter so as to receive with the maximum (or the minimum) of intensity and deduce therefrom the direction of the transmitter.

The apparatus described in the American Patent No. 1,471,406 do not constitute instantaneous and direct reading radiogoniometers since the direction of the transmitter can only be determined by pointing the explorer in the proper direction shown by the length of the fluorescent line on the screen.

In the radiogoniometer according to the invention, the luminous indicator device is a cathodic oscillograph in which the electronic beam is given two movements normal to each other, one of which is a function of the high frequency electromotive force induced in the rotating explorer and the other, called sweeping movement, is a function of the orientation of the explorer with respect to a standard direction in such manner that the displacement which results of the fluorescent spot on the screen of the oscillograph produces the appearance of a stationary fluorescent image which represents the law of variation of the intensity of reception as a function of the orientation of the explorer.

It is clear from the foregoing that the invention does not consist in the fact of rotating a cathodic oscillograph about a vertical axis in synchronism with the permanently rotating explorer, but in the fact of displacing the electronic beam under the control of the rotation of the explorer in a direction normal to that in which it is displaced under the effect of the high frequency electromotive force induced in the explorer.

The sweeping movement can be produced by a device comprising a rotor which rotates in synchronism with the explorer, and a stator.

According to one modification of the invention, the sweeping device is, for example, contrived in such manner as to apply to the cathodic oscillograph an alternating difference of potential of fundamental frequency equal to the number of revolutions of the explorer, the stator of this device being of angular position adjustable in such manner that the direction of its "neutral line" may be made to coincide with that of an observed transmitter and the rotor of this device being adjusted with respect to the rotating explorer in such manner that when this coincidence is attained the luminous figures traced by the spot of the electronic beam on the oscillograph screen are superposed on each other respectively in each of the sweeping directions.

This radiogoniometer is particularly well adapted to permit a movable object to be directed towards a transmitter.

To this end, the stator of the sweeping device is made integral with the moving object which carries the radiogoniometer according to the invention, in such a position that its "neutral line" makes an angle with the axis of the moving object which is equal to that which this axis is to make with the direction of the transmitter.

According to another modification of the invention, the above-mentioned sweeping device is contrived so as to apply to the cathodic oscillograph an alternating difference of potential of fundamental frequency equal to the number of revolutions of the explorer and so as to give rise to a slowing down of the variation of the difference of potential which it produces in at least a sector of only a few degrees located preferably outside the "neutral line," the angular position of the stator being adjustable in such manner as to be able to arrange the said sector in a position such that a minimum or a maximum of reception is produced during the corresponding slowing down.

When it is desired to utilize this radiogoniometer to facilitate the displacement of a moving object in a fixed direction, the stator of the sweeping device is made integral with the moving object in a position such that the axis of the above-mentioned sector makes the same angle with the axis of the moving object as this latter axis is to make with the direction of the transmitter.

Other peculiarities and details of the invention will appear in the course of the description of the annexed drawings and which refer to some radiogoniometers according to the invention described simply by way of example.

In these different figures, the same reference signs indicate identical elements.

Figure 1:
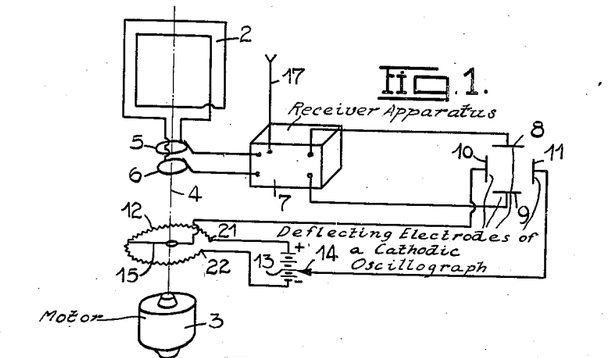
Figure 1 shows diagrammatically a first embodiment of a radiogoniometer according to the invention.

The radiogoniometer shown in Figure 1 comprises a rotating explorer constituted for example by a frame 2 driven by a motor 3 which rotates continuously about a vertical axis 4 at a speed of at least five revolutions per second. The electromotive force of variable amplitude induced in this frame during an emission of high frequency oscillations is collected by brushes in contact with rings 5 and 6 and is amplified in a suitable receiver apparatus 7 before being applied to a pair of electrodes deflecting the electronic beam of a cathodic oscillograph. These electrodes are constituted by plates 8 and 9.

The deviations of the electronic beam which are a function of the electromagnetic force induced in the frame by the high frequency oscillations are thus produced vertically in the apparatus shown.

Another pair of electrodes constituted by plates 10 and 11 is arranged perpendicularly to the first pair. To simplify the drawings, the cathodic oscillograph has only been represented by its two pairs of deflecting electrodes in Figure 1.

Between the plates 10 and 11 of the second pair, there is applied a variable difference of potential which, through the intermediation of a device which rotates in synchronism with the frame 2, is made a function of the orientation of the rotating explorer with respect to a standard direction. If the radiogoniometer is carried by a movable object, this standard direction is constituted, for example by the axis of the movable object and, if it is mounted in a fixed position, this standard direction is constituted, for example by the north direction.

A device permitting the obtaining of a difference of potential varying linearly as a function of the orientation of the explorer may be constituted, for example, by a potentiometer as shown in Fig. 1. This potentiometer comprises a fixed resistance wire 12, the extremities 21 and 22 of which are connected to an accumulator battery 13. A sliding contactor 15, which turns at the same time as the explorer, has its free end resting on the resistance wire 12.

The middle point 14 of the battery 13 is electrically connected to one of the deflecting plates 11 of the cathodic oscillograph. The other deflecting plate 10 is electrically connected to the sliding contactor 15.

Figure 2:
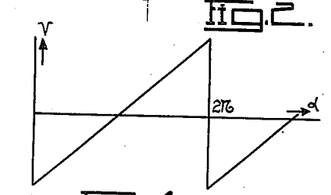
Figure 2 is a graphic representation of the variation of potential between the deflecting plates which cause the sweeping of the electronic beam in the radiogoniometer according to Figure 1.

When the explorer 2 rotates, the sliding contactor 15 turns with it and is displaced along the resistance wire 12. The difference of potential applied between the plates 10 and 11 varies as represented in Fig. 2. In this figure, the potential is represented as ordinates and the angle $\alpha$ of rotation of the explorer as abscissas.

At the end of each revolution, when the sliding contact 15 passes from one extremity of the winding of the potentiometer to the other, the potential difference applied between the deflecting plates 10 and 11 varies suddenly as shown by the vertical parts of the saw-tooth line of Figure 2. The variations of the difference of potential applied between the deflecting plates 10 and 11 control the horizontal deviations of the electronic beam, frequently called "sweeping." These horizontal deviations are thus proportional to the angle of rotation of the explorer and are synchronous with the speed of rotation of the latter.

Figure 3:
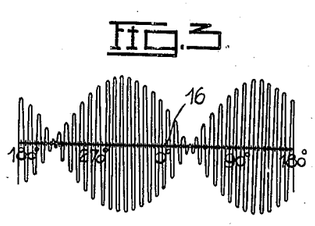
Figure 3 shows diagrammatically the luminous figure drawn on the screen of the cathodic oscillograph comprised by the radiogoniometer according to Figure 1.

The combination of the two movements of the cathode beam and of the speed of rotation of the frame causes the presence on the screen of the oscillograph of a stationary fluorescent image similar to that shown by Figure 3. This image is of the same form where the rotating explorer is a goniometric bobbin such as those used in the Bellini-Tosi system or in the Adcock system.

The rotating explorer may evidently be constituted by any other suitable directional system adapted particularly to the frequency of the radioelectric oscillations to be received. The stationary image will have a shape corresponding to the directional properties of the explorer used.

On referring to Figure 3, corresponding to the case of a frame, the two minima of reception will be seen as easily marked and it will be sufficient to superpose on the screen a segment of a graduated straight line 16, in order to immediately find the direction of the emission to which the explorer is regulated. By shifting by 90° the plane of the frame 2 with respect to the sliding contact 15 the minima of the fluorescent image will correspond to the actual direction and not to the direction to 90°.

Figure 6:
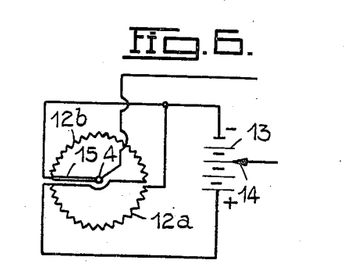
Figure 6 shows the modification to be made in Figure 1 in order to obtain the luminous image according to Figure 5.

It is also possible to arrange so that the total horizontal displacement of the electronic beam on the screen corresponds to half a revolution instead of a revolution of the explorer. For this, it is sufficient, for example, as shown in Fig. 6, to make the potentiometer of two semi-circular parts 12a and 12b connected in parallel on the battery 13. The variations of the difference of potential applied between the two deflecting plates 10 and 11 are then represented by the saw-tooth line of Figure 4 drawn at the same scale as that of Figure 2.

Figure 5:
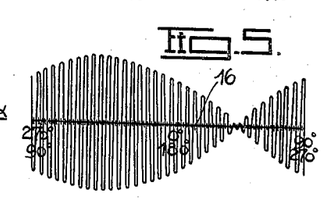
Figure 5 represents diagrammatically a luminous figure of the same kind as that of Figure 3, in the case where the total displacement of the electronic beam as a function of the orientation of the explorer is effected for each half-revolution of the explorer.

In these conditions, if the explorer is a frame, the parts of the figure corresponding to directions at 180° one from the other are superposed and in particular the two minima are located at the same place on the luminous image, as shown by Figure 5. This arrangement permits of obtaining a double precision for the same total length of image; it also facilitates the readings when for any reason the minima have not the same sharpness or are not at exactly 180° one from the other.

It is evident that the displacements of the electronic beam may be obtained by electrostatic or magnetic actions or by combinations of these actions.

The apparatus which have hereabove been described present a number of advantages as compared with previously existing apparatus. As compared with those referred to above, using a cathodic oscillograph, they present the advantage of giving by simple means, owing to the single explorer, a visual representation of the variation of the intensity of reception as a function of the orientation of the explorer, which is always of great advantage.

With respect to those which have a revolving explorer and a visual indicator (neon lamp, mirror galvanometer, etc.), they present the advantages attained by the absence of a movable mechanical member in the indicator system. The latter may be located anywhere with respect to the explorer; a plurality of indicators may be connected to the same explorer and be placed at different spots or be grouped according to the desired ends.

In the second place it is comparatively easy to carry out measurements on telegraphic emissions, even on very brief ones, since, owing to the form itself of the luminous image in the absence of emission, the swellings do not exist and the figure obtained during the periods of emission is not confused by that corresponding to the periods of silence.

In the third place, the cathodic oscillograph obeying the high frequencies (at least within certain limits) it is not necessary to detect, whence better correspondence between the amplitude of the high frequency electromotive force induced in the explorer and the corresponding deviations of the luminescent spot.

Figures 7, 8, 13, 14:
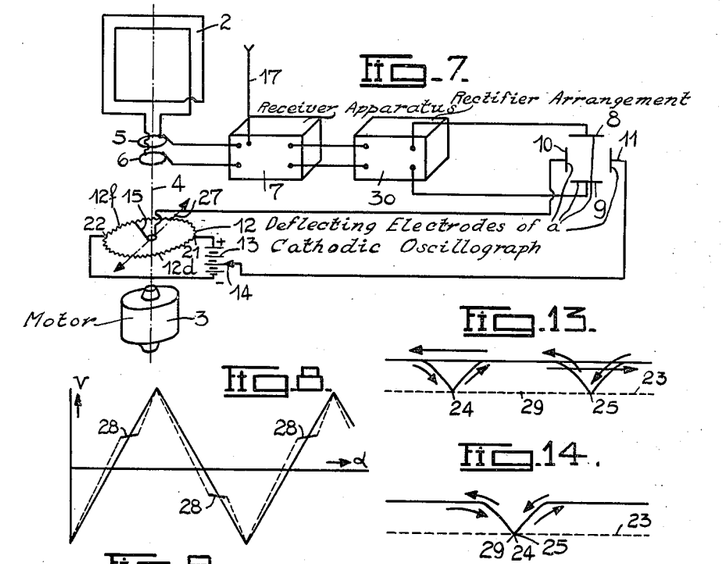
Figure 7 represents diagrammatically another embodiment of a radiogoniometer according to the invention.
Figure 8 is a graphical representation of the variation of the sweeping potential in the radiogoniometer according to Figure 7.
Figures 13 and 14 represent the luminous figures of the kind of those represented respectively on Figures 10 and 11 where the amplifier interposed between the explorer and the cathodic oscillograph comprises a device which limits the output potential of the amplifier to a maximum potential whatever may be the electromotive force induced in the explorer.

In the radiogoniometer shown in Figure 7, the sweeping device is constituted by a potentiometer the stator 12 of which comprises two semi-circular parts 12d and 12f of which two adjacent extremities are connected at 21 to one of the extremities of the battery of accumulators 13 whilst the two other adjacent extremities are connected at 22 to the other extremity of this battery.

Figure 4:
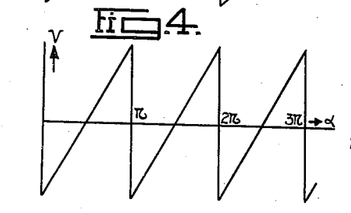
Figure 4 is a graphical representation of a variation of the sweeping potential in the case where this variation occurs for each half-revolution of the explorer.

The result of the connection adopted for the two semi-circular parts 12d and 12f is that the potential applied between the two deflecting plates 10 and 11 varies as a function of the orientation of the explorer as shown by the full line of Figure 8 drawn at the same scale as that of Figures 2 and 4.

Each time the movable contact 15 passes beyond one of the extremities 21 or 22, the variation of the potential applied between the deflecting plates 10 and 11, changes its signs. The deflecting plates 10 and 11 are therefore subjected to an alternating difference of potential of fundamental frequency equal to the number of rotations of the explorer 2.

In the absence of electromotive force of high frequency induced in the explorer, the fluorescent spot describes a horizontal segment of straight line 23 (Figure 9) represented dotted, the length of which corresponds to 180° of rotation of the explorer and which is traversed alternately first in one direction and then in the other. The centre 29 of this segment 23 corresponds to the positions of the movable contact 15 at equal electrical distances from the extremities 21 and 22 on the two halves of the potentiometer 12. We will call the imaginary line 27 which connects these positions, the "neutral line" of the potentiometer.

When in order to determine the direction of a transmitter, the minima of reception are taken as a basis, the movable contact 15 is preferably keyed on the shaft 4 perpendicularly to the plane of the frame used as the explorer. When the maxima are taken on the contrary as a basis, it is preferable to arrange the movable contact in the plane of the frame.

With a sweeping such as that above described, two orientations of the explorer at 180° one from the other, correspond to points of the segment 23 symmetrical with respect to the centre 29 of this segment and no more to the same point as in Figure 5. The luminous image obtained by applying to the deflecting plates 8 and 9 a potential of high frequency not detected arising from the rotating explorer, after amplification, is similar to that represented on Figure 9 when the explorer is a rotating frame or a goniometric coil of the Bellini-Tosi type. The points 24 and 25 corresponding to the minima of reception are symmetrical with respect to the point 29.

Figure 9:
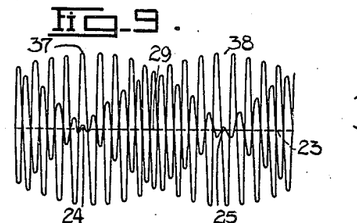
Figure 9 represents diagrammatically a luminous figure of the kind of that traced on the screen of the cathodic oscillograph of a radiogoniometer according to Figure 7, in the absence of a rectifier between the explorer and the corresponding deflecting plates of the cathodic oscillograph.
Figure 10:
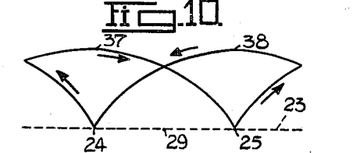
Figure 10 shows a luminous figure of the kind of that traced on the screen of the cathodic oscillograph of the radiogoniometer according to Figure 7.

In certain cases, the figure obtained by applying a high frequency potential between the plates 8 and 9 may be difficult to read on account of the superposing of certain portions of the fluorescent image. It is more advantageous to apply between these plates the potential rectified by known means (detector, diode, etc.). A rectifier arrangement of this kind is shown diagrammatically at 30 on Figure 7. There is thus obtained a figure similar to that of Figure 10, in which 24 and 25 again represent the position which corresponds to the minima of reception whilst the points 37 and 38 represent the position of the maxima. The relationship of Figure 10 to Figure 9 is evident. I have indicated by arrows along the luminous curves the directions in which the spot is supposed to move in tracing these curves.

The arrows below the curves indicate the displacement of the spot in one direction and those above the curves indicate the displacement of the spot in the other direction.

Figure 11:
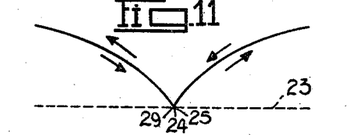
Figure 11 represents the figure obtained by means of the radiogoniometer according to Figure 7 in the case where the neutral line of the potentiometer is identical with the direction of the transmitter received, in an apparatus based on the observation of the minima of reception.

When the movable contact 15 is fitted perpendicularly to the plane of the frame, if the stator of the potentiometer is caused to rotate very slowly with respect to the speed of rotation of the movable contact 15, about the spindle 4, so that the direction of the neutral line approaches the direction of the transmitter, the points 24 and 25 which represent the two minima, approach each other and when the neutral line is directed towards the transmitter these two points coincide and the luminous figures traced by the spot respectively during its movements from left to right and from right to left become superposed as shown by Figure 11.

Figure 12:
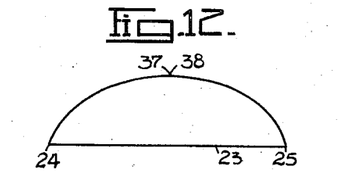
Figure 12 is obtained under the same conditions in an apparatus based on the observation of the maxima of reception.

If the maxima of reception are taken as a basis, this time supposing the movable contact 15 to be arranged in the plane of the frame 2, by carrying out the operation above described, Figure 10 becomes similar to Figure 12, the two maxima 37 and 38 of Figure 10 then coinciding instead of the minima.

Consequently whether the maxima or the minima of reception are taken as a basis, a novel method is provided of determining at once the direction of a transmitter, with an apparatus having visual indications and the explorer of which rotates permanently at a speed of at least five revolutions per second.

Where this radiogoniometer is installed on board a movable object which is to be directed towards the transmitter without its own position having to be known, the stator of the potentiometer is made integral with the movable object in a position such that its neutral line is parallel to the direction of the movable object forward.

Under these conditions, as soon as there is superposition of the two points 24 and 25, as shown by Figure 11, it is known that the neutral line of the potentiometer and consequently the forward direction of the movable object, are directed towards the transmitter. As soon as the movable object departs from the direction of the transmitter, the two points 24 and 25 move away one from the other.

The distance between the points 24 and 25 on the screen of the cathodic oscillograph corresponds to double the angle which the axis of the movable object makes with the direction of the transmitter. The angular distance may thus be determined quantitatively if the segment of line 23 has suitable graduations which are a function of the law of variation of the difference of potential between the deflecting plates 10 and 11 as a function of the orientation of the explorer 2.

The same reasoning applies to the maxima 37 and 38 of Figures 10 and 12.

If it were desired to direct the moving object in a direction making a fixed angle with the direction of the transmitter, it would evidently be necessary to cause the same angle to be made between the direction of the neutral line of the potentiometer and the axis of the movable object.

If, in consequence of local circumstances, the "neutral line" cannot be directed in parallel to the axis of the movable object, in order that the minima 24 and 25 coincide nevertheless when the transmitter is in the axis of the movable object, it is sufficient to adjust in the suitable sense, the rotating contact 15 with respect to the perpendicular to the plane of the frame by an angle equal to that made by the neutral line with the axis of the movable object.

When the bearings are based on the observation of the minima of reception, the appearance of the fluorescent figures may be easily improved by arranging so that the output potential of the amplifier 7 never exceeds a certain value, whatever may be the amplitude of the electromotive force induced in the explorer. The means of obtaining this limitation of the output potential of an amplifier are numerous and known (saturation of an element for example). When the value of the output potential is thus limited, it only represents the variation of amplitude of the electromotive force induced in the explorer, in the vicinity of the minima of reception which themselves remain perfectly represented. There are thus obtained on the oscillograph screen fluorescent images similar to those of Figures 13 and 14 which correspond respectively to the Figures 10 and 11 examined above. The precision of the readings is in no way modified by this limitation, but the appearance of the curves is improved.

With the class of sweeping above described with respect to the radiogoniometer according to Figure 7, the speed of the horizontal displacement of the spot on the screen varies regularly with the orientation of the rotating explorer except obviously at the extremities of the travel of the spot where there is a reversal of the direction of displacement.

Instead of having a regular sweeping of this character, it would be possible by means of a slight modification to have a sweeping which, in spite of the regular rotation of the explorer, causes an appreciable slowing down or even a complete stoppage of the spot each time the axis of the explorer sweeps certain predetermined sectors which do not exceed a few degrees. Outside these sectors, the horizontal displacement of the spot varies regularly with the orientation of the explorer. The representation on the fluorescent screen of the variations of amplitude of the electromotive force induced in the explorer which are produced in these sectors is thus concentrated on very small lengths of the segment of straight line 23 whilst whatever takes place outside these sectors remains represented on a larger angular scale.

Figure 15:
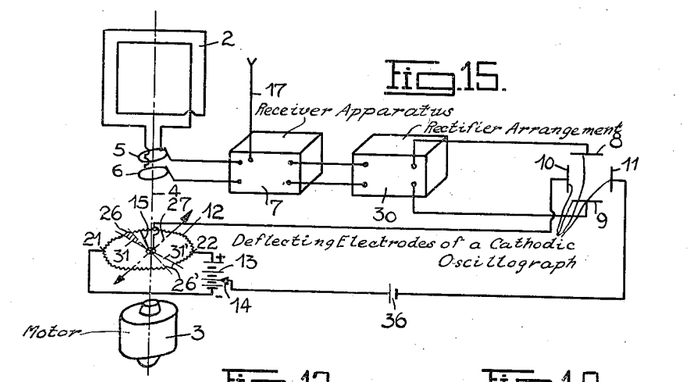
Figure 15 represents diagrammatically another embodiment of a radiogoniometer according to the invention.

There is easily obtained a sudden slowing of the horizontal movement of the spot by employing, for example, a radiogoniometer such as that represented by Figure 15, comprising a potentiometer, the stator 12 of which has in a sector 31 represented by hatchings, a certain number of turns 26, the resistance of which is very small and in any case appreciably less than that of the other turns of the stator.

When the movable contact 15 driven in synchronism with the explorer 2 by the motor 3 and the spindle 4 passes over these turns 26, the potential applied between the deflecting plates 10 and 11 remains almost constant instead of varying regularly as it does when the movable contact passes over the turns on each side of the turns 26. The variation of tension between the deflecting plates 10 and 11 corresponding to the orientation of the explorer is represented for example by the dashed line of Figure 8. This line has stages 28 to which correspond very pronounced slowing down of the sweeping movement of the spot.

Figure 16:
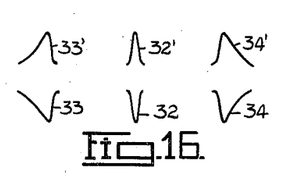
Figure 16 represents luminous curves obtained by means of the radiogoniometer according to Figure 15 in the vicinity of a maximum or of a minimum of reception.

The result is that if a maximum or a minimum of reception sufficiently pronounced takes place whilst the movable contact passes over the sector 31, the luminous curve in the vicinity of this maximum or minimum is shown in the form of a very sharp V similar respectively to the curves 32' and 32 of Figure 16.

But, if the minimum or the maximum is produced at the moment when the movable contact 15 which rotates with the explorer is reaching the sector in question, the luminous curve at the vicinity of this minimum or of this maximum is similar to the curves 33 or 33' of Figure 16, if the spot moves over the screen from left to right, and to the curves 34 or 34' if it moves from the right to the left. If the minimum or the maximum of reception is produced at the moment when the movable contact 15 is leaving the sector in question, the luminous curve is similar to the curves 34 or 34' or to the curves 33 or 33' of Figure 16 according to the direction of displacement of the spot on the screen.

The direction of displacement of the spot on the screen in a definite sector of the potentiometer for a given direction of rotation of the explorer depends upon the way of connection of the battery 13. When the apparatus is mounted on a moving object, it is therefore possible to so arrange that, by construction, the figure which corresponds to the minimum or to the maximum may be similar to the curves 33 or 33' when the moving object is directed slightly towards the left of the proper direction and similar to the curves 34 or 34' when it is directed slightly towards the right of the proper direction, whilst when it is directed exactly towards the transmitter, the figure is similar to the curves 32 or 32'. To retain a sufficient precision, it is desirable that the sector of slowing down of the sweeping movement of the spot does not exceed a few degrees.

It should be noted that it is sufficient to reverse the connections of the deflecting plates 8 and 9 with the detector 30 to change from the curves 32, 33, 34 to the curves 32', 33', 34', so that it is possible to obtain one or other of these groups of curves both with the minima as well as with the maxima of reception.

When an explorer is used, the directional characteristic of which has only one axis of symmetry such as, for example, an aerial placed at the focus of a parabolic reflector, or a frame combined with an aerial to obtain a directional characteristic in "cardioid," there is only one maximum or one minimum to be considered and it is sufficient to adjust the movable contact according to the axis of symmetry and the sector 31 according to the axis of the movable object in order that the above conditions may be realised.

But when the directional characteristic of the explorer has two axes of symmetry which are perpendicular such as when the explorer is a frame for example, a second minimum or a second maximum is produced equally for an orientation of the explorer at 180° from that which gives rise to the minimum or the maximum above dealt with.

To simplify the wording, we will consider in the explanations which follow only the case of the minimum; the case of the maxima is absolutely identical.

If the sector comprising the turns 26 has its axis merged with the neutral line of the potentiometer, this second minimum is superposed on the first one as in the case of the radiogoniometer according to Figure 7. The result is that the reading of the curves 32, 33 or 34 is made difficult owing to the vicinity of a more extended curve such as that shown on Figure 11.

If the stator of the potentiometer comprises furthermore in a sector 31' diametrically opposite to the sector 31, turns 26' similar to the turns 26, according to whether the first of the minima gives an image similar to the curve 33 or the curve 34, the minimum at 180° gives an image similar to the curve 34 or to the curve 33. In this case, owing to the superposing of symmetrical images, it becomes very difficult to deduce from an examination of the image on what side of the proper direction the moving object is directed.

To obviate this drawback, the turns 26, and eventually the turns 26' diametrically opposite, are chosen external of the "neutral line" of the stator of the potentiometer.

The larger the angle formed by the axis of the sectors 31 and 31' containing the turns 26 and 26' with the "neutral line," the more distant from each other are the points indicative of the minima at 180°. There is thus obtained in the case where the moving object is directed slightly to the left of the proper direction a luminous image such as that shown on Figure 17 and an image such as that of Figure 18 if it is directed slightly to the right of this direction.

When the radiogoniometer is carried by a moving object, if it is desired that the latter be directed towards the transmitter, it is furthermore necessary to fix the stator with respect to the moving object in such a position that the axis of the sector 31, and eventually of the sector 31', be merged with the axis of the moving object.

If it is desired that the moving object be directed in a direction forming a certain angle with the direction of the transmitter, for example to take into account the drift, it is necessary to fix the stator with respect to the moving object in such a position that the axis of the sector 31 and eventually of the sector 31', makes this angle with the axis of the moving object.

Figure 17:
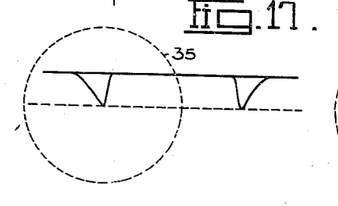
Figures 17 and 18 represent luminous figures of the kind of those obtained with the radiogoniometer according to Figure 15 under the conditions indicated with respect to Figure 13.
Figure 18:
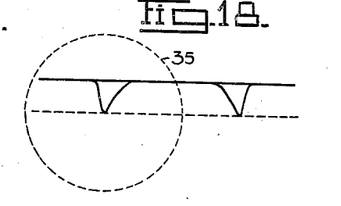

If the observer sees an image such as that shown on Figure 17, it is still necessary in order that he can deduce therefrom that he is directed to the left of the proper direction, for him to know that he is only to take into account indications which are given him by the curve of the minimum which is in the half on the left of the figure.

To obviate any possibility of error in this connection, it is furthermore arranged that the image of the second minimum (consequently that to the right on Figures 17 and 18) be thrown out of the screen represented by the broken line 35. The means for throwing a portion of the travel of the spot external of the screen are numerous and known; there is used, for example, a sweeping potential of great amplitude and the deflecting plate 10 is polarised with respect to the plate 11 by interposing a constant source of potential 36 of suitable value and polarity between the point 14 and the plate 11.

The alternating difference of potential of frequency equal to the number of revolutions of the explorer and which effects the sweeping of the electronic beam, needs not necessarily vary in a rectilinear manner for each half revolution of the explorer as shown in full lines on Figure 8.

Figures 19, 20, 21, 22:
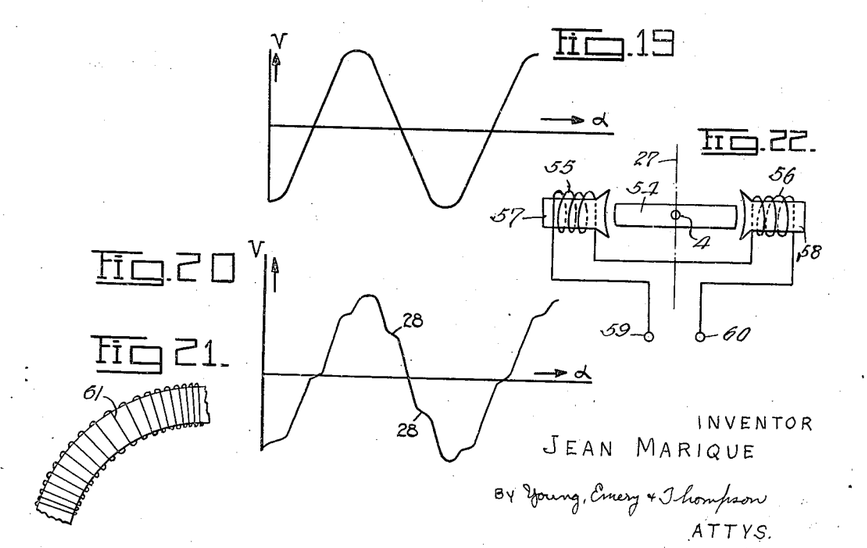
Figures 19 and 20 are graphic representations of two laws of variations of the sweeping potential applicable to the case of a radiogoniometer according to Figures 7 and 15.
Figure 21 shows a portion of a modification of a potentiometer adapted to be used in a radiogoniometer constructed in accordance with the invention.
Figure 22 shows diagrammatically a sweeping device comprising a single-phase sinusoidal alternator.

It is possible, for example, to use a potentiometer, the resistance wire 61 of which is closer wound at certain parts than at others, as shown in Fig. 21. Such a potentiometer constitutes one of the means adapted to vary the potential applied between the plates 10 and 11 according to a different law than the straight line law.

A suitable sweeping may also be obtained by replacing, for example, the potentiometer 12 and its movable contact 15, by a monophase sinusoidal alternator, the rotor of which is keyed on the shaft 4 and the frequency of which is equal to the number of revolutions per second made by the explorer. Such an alternator may be constituted of a permanent magnet 54 (Fig. 22) keyed to shaft 4 of the explorer 2 and rotating therewith and two stationary coils 55, 56 wound in series on magnetic cores 57, 58. The useful (effective) voltage is taken off from terminals 59, 60 of the coils which are connected to the deflector plates. The neutral line 27 corresponds to those positions of the permanent magnet 54 in which the voltage direction is reversed at terminals 59, 60. The potential applied to the deflecting plates is then represented by a curve such as that of the Figure 19.

The slowing down of the sweeping movement provided for in the radiogoniometer according to Figure 15 may be obtained by other means than that shown on this figure.

There may, for example, be applied between the deflecting plates 10 and 11, the potential of an alternator driven by the shaft 4 and of frequency equal to the number of revolutions per second of the explorer, to which are superposed harmonics of suitable phase and amplitude. It is possible for this purpose to use an alternator similar to that shown in Fig. 22 but wherein the pole shoes 57, 58 are angularly cut in a well-known manner so as to strengthen the harmonics.

In this case, the law of variation of the sweeping potential has a shape similar to that shown on Figure 20 which corresponds to a sinusoid of frequency equal to the number of revolutions per second of the explorer, to which is superposed a sinusoid of harmonic frequency of the preceding one. In the case of Figure 20, it is the sixth harmonic which is shown; the order of the harmonic is of no importance and is only given by way of example. The stages to be used preferably, in the case of a double symmetry explorer, are those which are produced external of the neutral line, that is to say, for example, one of the stages 28. The image of the second minimum being thrown outside the screen, it does not matter much whether there is a stage or not for this minimum.

What I claim is:

1. Instantaneous direct reading radiogoniometer, comprising a rotating explorer, means for generating, during the whole duration of each half revolution of the rotating explorer, a variable difference of potential in function of the orientation of the rotating explorer with respect to a standard direction in such a manner that this variable difference of potential returns suddenly to its initial value after each half revolution of the explorer, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, a graduated straight line traced on this screen in the direction of the sweeping movement of the spot, and means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer.

2. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator of adjustable angular position comprised in said means for generating the said variable difference of potential, and a rotor rotating in synchronism with the explorer, also comprised in said means, said rotor having relatively to the explorer an angular position such that when the "neutral line" of the stator is brought into a position for which there is superposition of the luminous images swept out by the spot in one direction and then in the other, the direction of the neutral line coincides with that of the transmitter observed.

3. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator comprised in said means for generating the said variable difference of potential, carried by a moving object in such a position that its "neutral line" forms with the axis of the moving object forward, an angle equal to that which this axis is to make with the direction of an observed transmitter, and a rotor rotating in synchronism with the explorer, also comprised in said means, said rotor having relatively to the explorer an angular position such that when the "neutral line" of the stator is brought into a position for which there is superposition of the luminous images swept out by the spot in one direction and then in the other, the direction of the neutral line coincides with that of the transmitter observed.

4. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, means for slowing down the variation of said difference of potential in at least one sector of a few degrees only, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, and a stator of adjustable angular position comprised in said means for generating the said variable difference of potential, permitting to bring the sector of slowing down into a position for which a change in the sign of the variation of reception is observed in said sector.

5. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, means for slowing down the variation of said difference of potential in at least one sector of a few degrees only, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, and a stator comprised in said means for generating the said variable difference of potential, carried by a moving object in such a position that the axis of said sector forms with the axis of the moving object forward the same angle as this latter axis is to make with the direction of an observed transmitter.

6. An instantaneous direct reading radio-goniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, means for applying between the deflecting electrodes of one pair a tension which is a function of the high frequency electromotive force generated in said rotating explorer, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator comprised in said means for generating the said variable difference of potential, means for slowing down the variation of said difference of potential in at least one sector of a few degrees only located externally of the "neutral line" of said stator, the latter being of adjustable angular position permitting to bring the sector of slowing down into a position for which a change in the sign of the variation of reception is observed in said sector, and means for effecting the throwing of the representation of one of the changes in the sign of the variation of reception of the observed transmitter, outside said screen.

7. An instantaneous direct reading radio-goniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, a rectifying arrangement to which is applied a tension which is a function of the high frequency electromotive force induced in the rotating explorer, means for applying the rectified tension obtained at the outlet terminals of said rectifying arrangement between the deflecting electrodes of one pair, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator of adjustable angular position comprised in said means for generating the said variable difference of potential, and a rotor rotating in synchronism with the explorer, also comprised in said means, said rotor having relatively to the explorer an angular position such that when the "neutral line" of the stator is brought into a position for which there is superposition of the luminous images swept out by the spot in one direction and then in the other, the direction of the neutral line coincides with that of the transmitter observed.

8. An instantaneous direct reading radio-goniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, a rectifying arrangement to which is applied a tension which is a function of the high frequency electromotive force induced in the rotating explorer, means for applying the rectified tension obtained at the outlet terminals of said rectifying arrangement between the deflecting electrodes of one pair, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator comprised in said means for generating the said variable difference of potential, carried by a moving object in such a position that its "neutral line" forms with the axis of the moving object forward, an angle equal to that which this axis is to make with the direction of an observed transmitter, and a rotor rotating in synchronism with the explorer, also comprised in said means, said rotor having relatively to the explorer an angular position such that when the "neutral line" of the stator is brought into a position for which there is superposition of the luminous images swept out by the spot in one direction and then in the other, the direction of the neutral line coincides with that of the transmitter observed.

9. An instantaneous direct reading radio-goniometer, comprising a rotating explorer, a cathodic oscillograph, means for generating a variable difference of potential in function of the orientation of the rotating explorer with respect to a standard direction in such manner that this variable difference of potential is of fundamental frequency equal to the number of rotations per second of the explorer, means for slowing down the variation of said difference of potential in at least one sector of a few degrees only, a cathodic oscillograph with two pairs of deflecting electrodes of the electronic beam perpendicular to each other, a rectifying arrangement to which is applied a tension which is a function of the high frequency electromotive force induced in the rotating explorer, means for applying the rectified tension obtained at the outlet terminals of said rectifying arrangement between the deflecting electrodes of one pair, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, and a stator of adjustable angular position comprised in said means for generating the said variable difference of potential, permitting to bring the sector of slowing down into a position for which a change in the sign of the variation of reception is observed in said sector.

10. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, means for slowing down the variation of said difference of potential in at least one sector of a few degrees only, a cathodic oscillograph with two pairs of deflecting electrodes of the electronic beam perpendicular to each other, a rectifying arrangement to which is applied a tension which is a function of the high frequency electromotive force induced in the rotating explorer, means for applying the rectified tension obtained at the outlet terminals of said rectifying arrangement between the deflecting electrodes of one pair, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, and a stator, comprised in said means for generating the said variable difference of potential, carried by a moving object in such a position that the axis of said sector forms with the axis of the moving object forward the same angle as this latter axis is to make with the direction of an observed transmitter.

11. An instantaneous direct reading radiogoniometer, comprising a rotating explorer, a cathodic oscillograph, means for generating a variable difference of potential in function of the orientation of the rotating explorer with respect to a standard direction in such a manner that this variable difference of potential is of fundamental frequency equal to the number of rotations per second of the explorer, a cathodic oscillograph with two pairs of deflecting electrodes of the electronic beam perpendicular to each other, a rectifying arrangement to which is applied a tension which is a function of the high frequency electromotive force induced in the rotating explorer, means for applying the rectified tension obtained at the outlet terminals of said rectifying arrangement between the deflecting electrodes of one pair, means for applying between the deflecting electrodes of the other pair the said variable difference of potential in order to impart a sweeping movement to the electronic beam, a screen on which the fluorescent spot of the electronic beam appears, means for rotating the explorer at a speed of at least five revolutions per second in such manner that the displacement which results of the fluorescent spot on said screen produces the appearance of a stationary fluorescent image which represents the law of variation of the intensity of reception as a function of the orientation of the explorer, a stator comprised in said means for generating the said variable difference of potential, means for slowing down the variation of said difference of potential in at least one sector of a few degrees only located externally of the "neutral line" of said stator, the latter being of adjustable angular position permitting to bring the sector of slowing down into a position for which a change in the sign of the variation of reception is observed in said sector, and means for effecting the throwing of the representation of one of the changes in the sign of the variation of reception of the observed transmitter, outside said screen.

JEAN MARIQUE.